June 28, 1949.  J. F. SCHOEPPEL  2,474,549
GYROSCOPE
Filed April 19, 1945

INVENTOR
JOHN F. SCHOEPPEL

BY George N. Fisher
ATTORNEY

Patented June 28, 1949

2,474,549

UNITED STATES PATENT OFFICE 2,474,549

GYROSCOPE

John F. Schoeppel, Minneapolis, Minn., assignor to Minneapolis-Honeywell Regulator Company, Minneapolis, Minn., a corporation of Delaware Application April 19, 1945, Serial No. 589,130

6 Claims. (Cl. 74—5.47)

This invention relates to the field of gyroscopes, and its advantages are most perfectly realized in gyroscopic instruments of precision such as are used in the control of aircraft. In such instruments, for example, in an artificial or gyro horizon, it is essential that the spin axis of the gyroscope remain vertical at all times.

If a simple gyroscope, which maintains its spin axis in space is oriented with the axis vertical, there is observable the phenomenon of apparent departure of the axis of the gyroscope from the vertical at a steady rate such that it performs a complete evolution and returns to its original position with respect to the vertical once each day. This is due to the fact that the direction of the vertical at any point is always toward the center of the earth. Since the earth is continually rotating, the direction of the vertical is continually changing, and the observer is moving with it. The axis of the gyroscope, on the other hand, remains stable in space, so the actual movement of the vertical with respect to the gyroscope is observed as apparent movement of the gyroscope axis with respect to the vertical.

There are other forces which tend to cause the axis of a gyroscope to depart from its initial vertical position, and among these may be included friction in the gimbal mountings, lack of perfect balance of the gyroscope, with concomitant velocity effects, and so forth.

These difficulties with gyro horizons have for some time been known, and devices for attempting to maintain the spin axis of a gyroscope vertical have been devised: such mechanisms are referred to as erection systems, and the present invention is specifically an improved and novel erection system for vertical gyroscopes.

It is an object of my invention to provide a gyroscope having a new and improved erection system.

It is another object of my invention to provide a gyroscope erection system in which gravity responsive members carried by the gyroscope cooperate in a novel fashion with electromagnetic means for applying forces to return the axis of the gyroscope to the vertical.

It is yet another object of my invention to provide a novel gyroscope erection system including torque motors applying couples of torque to the gyroscope housing tending normally to rotate it about the spin axis of the gyroscope.

It is a further object of my invention to provide an erection system for a gyroscope including normally independent means each effective about one of the gimbal axes of the gyroscope.

It is a still further object of my invention to provide gyroscope erecting means as just recited in which erection about one of the axes may be cut out at the desire of the operator.

It is a specific object of my invention to provide a gyroscope erecting means comprising a plurality of torque motors fixed with respect to the gyroscope housing and effective individually to apply torque to the housing in a direction normally tending to cause rotation of said housing about the spin axis of said gyroscope, together with gravity responsive means for varying the energization of pairs of said torque motors.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing, Figure 1 is an elevation of a gyroscope embodying my invention, parts being broken away for purposes of more clearly illustrating the invention;

Figure 1:
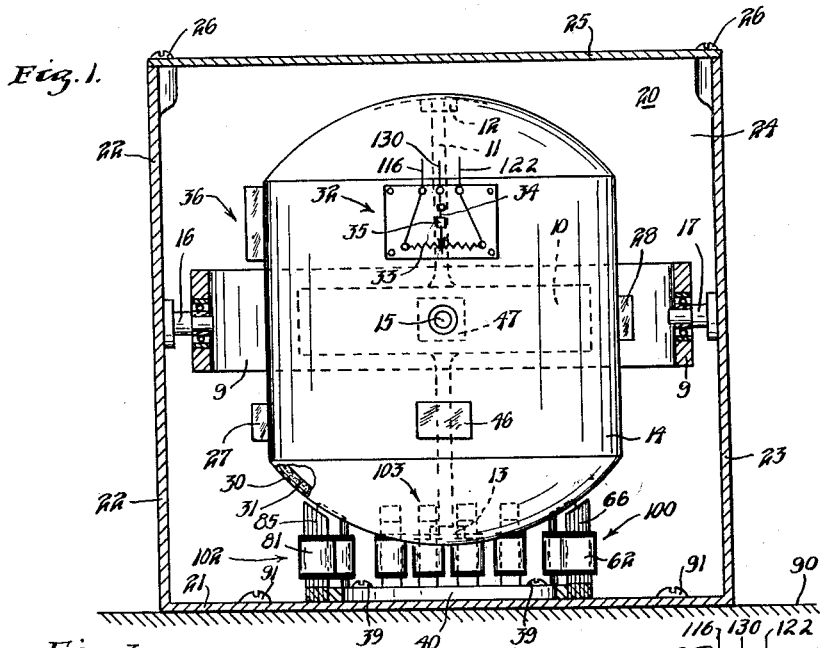

Referring now to Figure 1, it will be seen that my gyroscope comprises a rotor 10 mounted for rotation about a vertical axis passing through a shaft 11, the latter being received in suitable bearings 12 and 13 in the housing 14 of the gyroscope. This structure is conventional, and it will be realized that the rotor may be caused to rotate by electric or fluid motor means at the choice of the user. The gyroscope is pivotally mounted in a Cardan ring 9 as indicated at 15, and the Cardan ring in turn is pivotally supported as at 16 and 17 by a casing 20. The arrangement is such that axes 15, 16—17, and 12 have a common point, and this point is meant hereafter when the "center" of any one of the axes is referred to.

For illustrative purposes, casing 20 is shown as being generally cubical and comprising a bottom 21, side walls 22 and 23, a front wall, not shown, a rear wall 24, and a cover 25, the latter being fastened to casing 20 by suitable means such as screws 26.

The lower portion of the housing 14 of my gyroscope is shown to take the form of a portion of a sphere, and is comprised of an outer layer 30 of copper or other conducting material and an inner layer 31 of magnetically reactive material, such as powdered iron sintered together to form a parti-spherical shell.

Mounted on the housing 14 in a plane normal to axis 15 is a gravity responsive potential divider indicated generally by the reference numeral 32. Potential divider 32 is shown to comprise a linear, normally horizontal winding 33 and a pendulous contacting slider 34 whose direction is always maintained parallel to that component of apparent gravity which is in the plane of wall 24 by a weight 35. A similar gravity responsive potential divider 36 comprised of a winding 37 and a slider 38 is shown as mounted on housing 14 in a plane perpendicular to that of potential divider 32, for response to that component of apparent gravity which is at right angles to the component first described.

In order not to disturb the static and dynamic balance of the gyroscope, each potential divider must be counter-balanced by suitable masses. Thus, the mass of potential divider 36 above the axis 16—17 is counter-balanced by a counter-weight 27 below axis 16—17, and the sum of the masses of members 27 and 36 to the left of axis 15 is counter-balanced by a counter-weight 28 to the right of axis 15. Counter-weights 46 and 47 perform the same functions with respect to potential divider 32 as counter-weights 27 and 28 respectively do for potential divider 36, counter-weight 47 being bored to provide a mounting for a bearing for the shaft connecting housing 14 with ring 9. Alternatively, counter-weight 47 can be mounted on Cardan ring 9 in the same relative location as regards axis 16—17.

Figure 2:
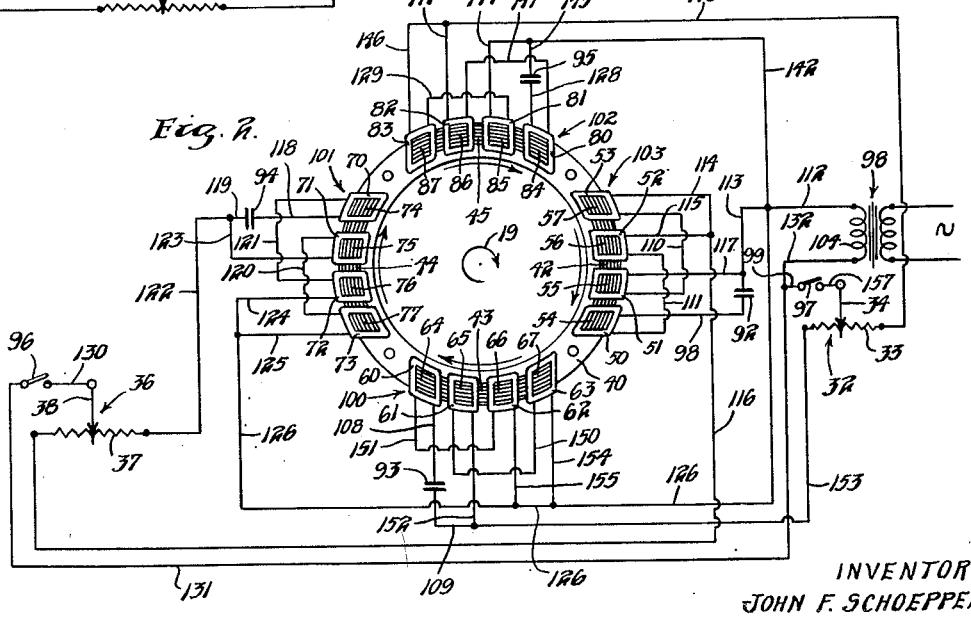
Figure 2 is a wiring diagram of the erection system comprising my invention.

Fastened to the bottom 21 of casing 20 as by screws 39 is a mounting ring or annulus 40 into which are fastened by pressing or other suitable means a plurality of armatures 42, 43, 44, and 45 arranged in diametrically opposite pairs, 42 and 44 comprising one pair and 43 and 45 comprising another pair of these armatures. Each of these armatures is of laminated construction, the laminations being pressed into annular member 40 so as to be formed into a curvilinear pattern as shown in Figure 2. The armatures each comprise a horizontal, circumferentially extending lower or base portion from which integrally extend upwardly a plurality of separate pole portions, the upper ends of the pole portions being machined to form jointly a spherical surface which is concentric with the sphere formed by conducting member 30 and of slightly larger radius.

Each of the poles of each of the armatures is provided with a coil or winding for the purpose of magnetically exciting the pole. Thus, windings 50, 51, 52, and 53 are provided on poles 54, 55, 56, and 57 of armature 42: windings 60, 61, 62, and 63 are provided on poles 64, 65, 66, and 67 of armature 43: windings 70, 71, 72, and 73 are provided on poles 74, 75, 76, and 77 of armature 44: and windings 80, 81, 82, and 83 are provided on poles 84, 85, 86, and 87 of armature 45.

Casing 20 is mounted rigidly by suitable screws 91 to some fixed portion of a craft, such for example as an aircraft framing member indicated by reference numeral 90.

As shown in Figure 2, my erection system also comprises a plurality of condensers 92, 93, 94, and 95, a pair of single pole, single throw switches 96 and 97, and a transformer 98 for supplying electrical energy at a desired voltage from any suitable source.

For purposes of definition, I will hereafter refer as torque motor 100 to armature 43 with its poles and coils and the cooperating portion of spherical members 30 and 31. Similarly, torque motors 101, 102, and 103 are now defined as armatures 44, 45, and 42, respectively, together with their respective poles and windings, and the cooperating portions of members 30 and 31.

Referring now more particularly to Figure 2, it will be seen that the primary winding of transformer 98 is continuously energized from a suitable source of alternating current. A number of circuits are energized from secondary winding 104, and these circuits will now be traced from the upper terminal to the lower terminal of the secondary winding.

The first circuit includes conductors 112, 113, and 117, coil 51, conductor 110, coil 53, conductors 114, 116, a portion of winding 37 of potential divider 36, slider 38, conductor 130, switch 96, conductor 131 and conductor 132.

A second circuit includes conductors 112 and 113, condenser 92, conductor 98, coil 50, conductor 111, coil 52, conductor 115, 116, a portion of winding 37 of potential divider 36, slider 38, conductor 130, switch 96, and conductors 131 and 132.

A third circuit includes conductors 112 and 126 and 154, coil 63, conductor 150, coil 61, conductor 152, 153, a portion of winding 33 of potential divider 32, slider 34, conductor 157, switch 97, conductors 99 and 132.

A fourth circuit includes conductors 112, 126, and 155, coil 62, conductor 151, coil 60, conductor 108, condenser 93, conductors 109, and 153, a portion of winding 33 of potential divider 32, slider 34, conductor 157, switch 97, and conductors 99 and 132.

A fifth circuit includes conductors 112, 126, and 125, coil 73, conductor 120, coil 71, conductor 123, and 122, a portion of winding 37 of potential divider 36, slider 38, conductor 130, switch 96, conductors 131 and 132.

A sixth circuit includes conductors 112, 126, and 124, coil 72, conductor 121, coil 70, conductor 118, condenser 94, conductors 119 and 122, a portion of winding 37 of potential divider 36, slider 38, conductor 130, switch 96, and conductors 131 and 132.

A seventh circuit includes conductors 112, 142, and 145, condenser 95, conductor 128, coil 80, conductor 141, coil 82, conductors 147 and 148, a portion of winding 33 of potential divider 32, slider 34, conductor 157, switch 97, and conductors 99 and 132.

An eighth and final circuit includes conductors 112, 142, and 144, coil 81, conductor 129, coil 83, conductor 146, 148, a portion of winding 33 of voltage divider 32, slider 34, conductor 157, switch 97, and conductors 99 and 132.

From a study of the above circuits, it will be apparent that in each armature the two odd numbered coils and the two even numbered coils are respectively connected in series, while in the series circuit including the even numbered coils, a condenser is also included. In each armature it is also true that the series circuit including the condenser is connected in parallel with the series circuit not including the condenser, so that when the parallel circuit is energized with alternating voltage, the voltage drops across the two sets of series windings are in quadrature. When these windings are energized in quadrature a progressive magnetic field is set up as is well known to those skilled in the art, and the field induced thereby in member 30 coacts with the inducing field to provide torque between the armature and the housing, the direction of the torque depending on which of the fields in the armature leads the other.

*Operation*

Figure 3:
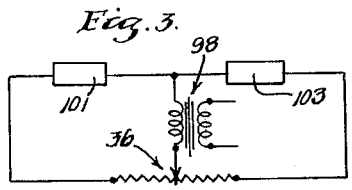
Figure 3 is a simplified showing of the subject matter of Figure 2.

The operation of my invention will now be explained. First let it be assumed that the casing 20 is oriented with its bottom 21 in a horizontal position, and that the housing of the gyroscope is so located on its gimbals that the axis of spin is vertical. The direction of spin of the gyroscope is indicated by arrow 19. Under these conditions, torque motors 101 and 103 are equally energized from transformer 98 under the control of potentiometer 36, and torque motors 100 and 102 are equally energized from transformer 98 under the influence of potentiometer 32. The direction of action of each torque motor is indicated in Figure 2. This energization is most easily understood by reference to Figure 3, which is a simplification of Figure 2 presented to make clear the method of operation of my erection system about a single axis. It will be seen that potential divider 36 is divided into two portions by the slider and that each portion is connected in series with one of the torque motors. So long as the slider is in the center of the potentiometer, the voltage drops through the two portions of the divider are equal and equal voltage drops are impressed upon the input terminals of the torque motors.

Torque motors 100 and 102 are so arranged as to apply a mechanical couple tending to cause rotation of housing 14 about an axis, hereafter called the effective center of application of the force, passing through member 40 and perpendicular thereto. Under the conditions of the gyroscope and housing assumed, the torque motors are equally energized, so that the axis about which the couples act passes through the center of member 40 and also, due to the geometry of the structure as previously set forth, through the point of intersection of the gimbal axes of the gyroscope. Therefore the motors simply tend to rotate the housing in the plane of its gimbals, which is of course impossible. In other words, since the forces exerted by the two torque motors are equal in magnitude and opposite in direction as far as the gimbal axes are concerned, they have no tendency to tilt the gyroscope in its gimbals about the axis of pivots 16 and 17. Similarly, torque motors 101 and 103 are equally energized and there is no force tending to tilt the gyroscope about the axis of pivots 15.

Now suppose that for some reason, while the housing has not moved, the gyroscope has departed from its normal position so that shaft 11 is no longer vertical, but is inclined with respect to the vertical about axis 15 with its upper end displaced to the left from its position as shown in Figure 1. This results in movement of slider 34 to the left along winding 33, causing the resistance in series with motor 100 to be reduced and that in series with motor 102 to be increased. Torque motors 100 and 102 are no longer equally energized, and the effective center of application of their torque no longer passes through the intersection of the gimbal axes; accordingly there is an unbalanced torque component, acting in a direction to the left as seen in Figure 2, tending to rotate gyroscope 14 and Cardan ring 9 about the axis 16—17 (as seen in Figure 1). According to the well known laws of gyroscopic precession, this torque results in rotation of gyroscope 14 about axis 15, and this in turn results in movement of slider 34 back across winding 33. As this movement of the slider takes place, the inequality of energization of motors 100 and 102 is reduced until, when the gyroscope is again level, the motors are equally energized and no force acts on the gyroscope.

It will be apparent that a similar action takes place if the gyroscope axis departs from the vertical about axis 16—17, the restoring force being provided by torque motors 101 and 103, and that any compound displacement of the spin axis from vertical is corrected by joint action of both sets of potential dividers and torque motors.

Now suppose that the craft changes its attitude, in such a manner for example, as to raise the left-hand end of support 90 as seen in Figure 1, the gyroscope remaining with its spin axis vertical. This motion is accompanied by a movement of motors 100, 101, 102, and 103 with respect to housing 14 which is stabilized, but voltage divider 32 is also stabilized and no change in the differential energization of the torque motors is brought about. Therefore, although there is as before a component of the torque of each motor acting to rotate the gyroscope about one of its gimbal axes, the forces are still equal and opposite, and no resultant motion of the gyroscope takes place. If, however, the gyroscope should depart from its vertical condition while the attitude of the craft is as just described, the sliders 34 and 38 are again able to vary the differential energization of the respective torque motors so as to apply restoring torques to bring the gyroscope back to its proper position. This action is limited only by the area of the spherical surface 30 with which the poles of the torque motors are adapted to cooperate.

Figure 4:
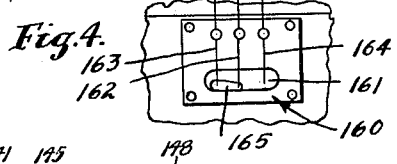
Figure 4 shows a modification of the invention embodying gravity responsive switch.

It should be pointed out that the erecting signal given by each of the potential dividers is one which increases in magnitude as the departure of the gyroscope from the vertical increases, and the system is thus a modulating system. If this type of operation is not desired, suitable single pole, double throw switches of the gravity responsive type, such for example as mercury switches, can be substituted for the potential dividers, giving full erection rate as soon as the gyroscope departs appreciably from the vertical. Figure 4 shows a modification of the invention in which there is substituted in the gravity responsive voltage divider 32, a suitable single pole double throw mercury switch 160, comprising an envelope 161 enclosing a central electrode 162 and two end electrodes 163 and 164, together with a contact making globule of mercury 165.

Numerous objects and advantages of my invention have been set forth in the foregoing description together with details of the structure and function of the invention, and the novel features thereof are pointed out in the appended claims. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. In a device of the class described, in combination, a gyroscope having a spin axis, means mounting said gyroscope for rotative movement about a pair of mutually perpendicular gimbal axes normally perpendicular to said spin axis, means applying to said gyroscope a pair of forces which in the normal position of the gyroscope provide a turning couple about an axis passing through the intersection of said gimbal axes and axially spaced therefrom, and means effective to vary the magnitude of said forces, whereby to precessively exert a torque about a gimbal axis of said gyroscope, said second named means comprising a torque motor having a pair of exciting windings and a magnetically reactive member arranged for relative rotative movement, said last named means comprising means for differentially energizing said exciting windings of said torque motor.

2. In a device of the class described, in combination, a gyroscope having a spin axis, means mounting said gyroscope for rotatable movement about a pair of mutually perpendicular gimbal axes normally perpendicular to said spin axis, means applying to said gyroscope a plurality of pairs of forces which provide in the normal position of said gyroscope a pair of turning couples about axes normally passing through the intersection of said gimbal axes and axially spaced therefrom, and means effective to vary the magnitude of said plurality of pairs of forces, whereby to precessively exert torques about said gimbal axes of said gyroscope, said second named means comprising torque motors each having a pair of exciting windings and a magnetically reactive member arranged for relative rotative movement, said last named means comprising means for differentially energizing said exciting windings of said torque motors.

3. In a device of the class described, in combination, a gyroscope having a spin axis, a housing, means mounting said gyroscope in said housing for rotative movement about a pair of mutually perpendicular gimbal axes normally perpendicular to said spin axis, means applying to said gyroscope a pair of forces which in the normal position of said gyroscope provide a turning couple about an axis normally passing through the intersection of said gimbal axes and axially spaced therefrom, and means effective to vary the magnitude of said forces, whereby to precessively exert a resultant torque about said gimbal axis of said gyroscope, said second named means comprising a torque motor having first and second members carried respectively by said housing and said gyroscope for relative rotative movement, one of said members comprising a pair of exciting windings and an armature cooperating therewith, the other of said members comprising an electrical conductive lamination and a magnetically reactive lamination, said last named means comprising circuit control means for differentially energizing said exciting winding of said torque motor, said circuit control means being responsive to departure of said spin axis of the gyroscope from a normal direction, whereby to electromagnetically bring about return of said gyroscope to said normal position.

4. In a device of the class described, in combination, a gyroscope having a spin axis, a housing, means mounting said gyroscope in said housing for rotative movement about a pair of mutually perpendicular axes normally perpendicular to said spin axis, means applying to said gyroscope a plurality of pairs of forces to provide a pair of turning couples in the normal position of said gyroscope about an axis passing through the intersection of said gimbal axes and axially spaced therefrom, and means effective to vary the relative magnitudes of said plurality of pairs of forces, whereby to precessively exert a resultant torque about said gimbal axes of said gyroscope, said second named means comprising torque motors each having first and second members carried by said housing and said gyroscope for relative rotative movement, one of said members of each of said motors comprising an electrically conductive lamination and a magnetically reactive lamination, said last named means comprising circuit control means for differentially energizing said exciting windings of said torque motor, said circuit control means being responsive to departure of said spin axis of said gyroscope from a normal direction whereby to electromagnetically bring about return of said gyroscope to said normal position.

5. In a device of the class described, in combination, a body whose position is to be controlled, means mounting said body for rotation about first and second mutually perpendicular axes, means applying to said body a plurality of pairs of forces which in the normal position of the body provide a pair of turning couples about axes passing through the intersection of said first and second axes, and means effective to vary the magnitudes of said forces so as to exert upon said body resultant torques about said first and second axes, said second means comprising torque motors each including a pair of exciting windings and a magnetically reactive member arranged for relative rotative movement, said last named means including circuit control means for differentially energizing said exciting windings.

6. In a device of the class described, in combination, a plurality of torque motors, first and second gravity responsive circuit control members, and means energizing said plurality of torque motors unequally in opposite senses upon opposite deviations of said gravity responsive members from their normal positions, said torque motors each comprising a plurality of pairs of exciting windings mounted on an armature structure, said armature structure of each of said torque motors extending axially from a common annular base, the ends of said armatures remote from said base jointly forming portions of a spherical surface, said torque motors having a common spherical conductive member.

JOHN F. SCHOEPPEL.

REFERENCES CITED

The following references are of record in the file of this patent:

UNITED STATES PATENTS

| Number | Name | Date |
|---|---|---|
| 428,650 | Thomson | May 27, 1890 |
| 1,559,920 | Stewart | Nov. 3, 1925 |
| 1,651,845 | Sperry | Dec. 6, 1927 |
| 1,731,057 | Overholt | Oct. 8, 1929 |
| 2,229,645 | Esval et al. | Jan. 28, 1941 |
| 2,270,876 | Esval et al. | Jan. 27, 1942 |
| 2,292,989 | Carter | Aug. 11, 1942 |
| 2,339,606 | Sias | Jan. 18, 1944 |
| 2,409,188 | Baddon et al. | Oct. 15, 1946 |